J. A. CHARTER.
METAL WHEEL.
APPLICATION FILED OCT. 30, 1919
1,359,964.
Patented Nov. 23, 1920.
3 SHEETS—SHEET 1.
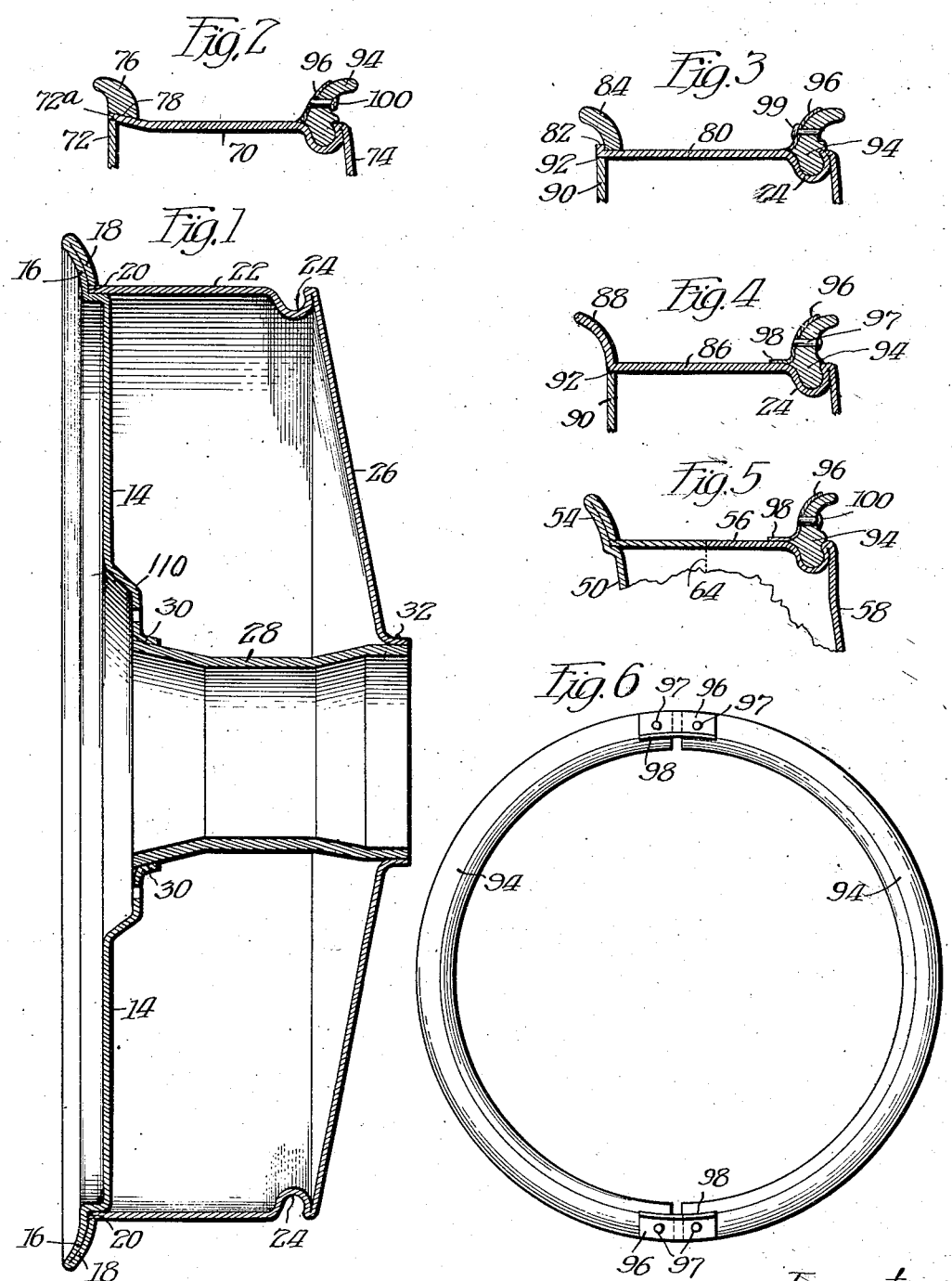
Inventor:
James A. Charter,
By Cheever & Cox
attys.

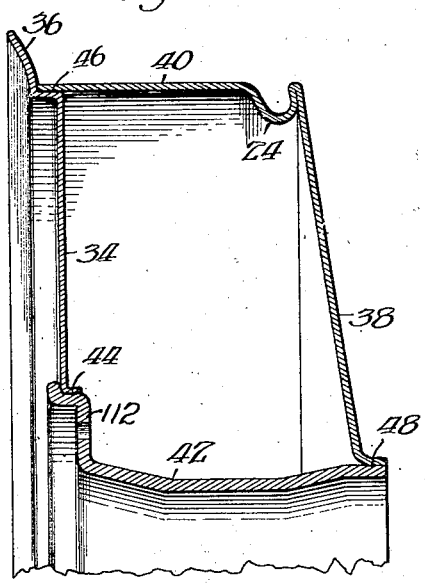
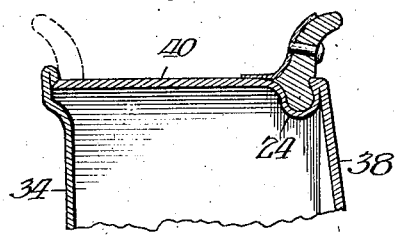
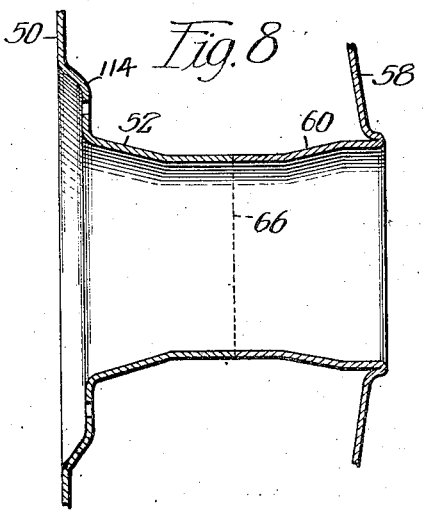
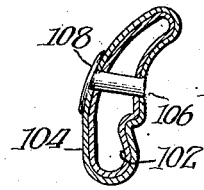
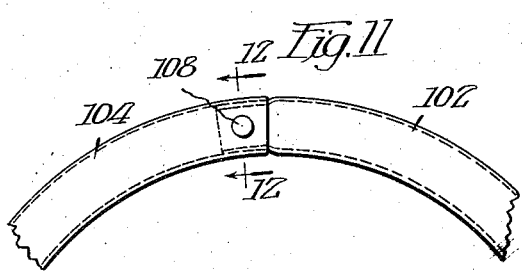

J. A. CHARTER.
METAL WHEEL.
APPLICATION FILED OCT. 30, 1919.
1,359,964.
Patented Nov. 23, 1920.
3 SHEETS—SHEET 3.
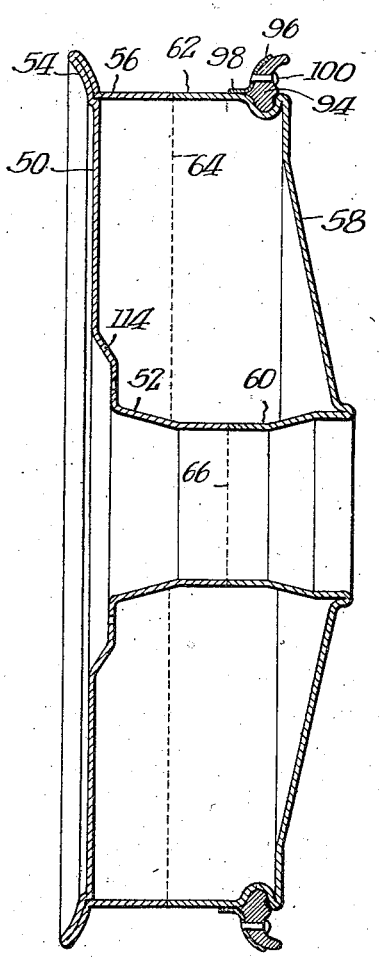
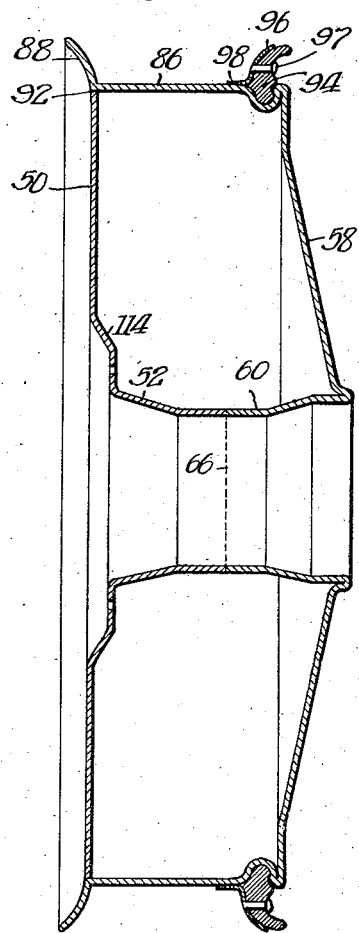
Inventor:
James A. Charter,
By Cheever & Cox
Attys.

UNITED STATES PATENT OFFICE.

JAMES A. CHARTER, OF CHICAGO, ILLINOIS.

METAL WHEEL.

1,359,964.

Specification of Letters Patent. Patented Nov. 23, 1920.

Application filed October 30, 1919. Serial No. 334,385.

*To all whom it may concern:*

Be it known that I, JAMES A. CHARTER, a citizen of the United States, residing at Chicago, in the county of Cook and State of Illinois, have invented a certain new and useful Improvement in Metal Wheels, of which the following is a specification.

This invention relates to metal wheels having tire rims carrying ordinary or specially invented tire retaining rings therefor. The objects of the invention are to provide (1) a metal disk wheel in which the side disks are made in separate parts placed opposite each other, and welded together to form a continuous tire supporting rim with or without a continuous, practically internal, hub, there being, in forming the wheel, preferably not more than two lines of weld—one in the rim—the other in or adjacent to the hub. (2) To form a metallic disk wheel in which a central hub, with one expanded end is used, the expansion on said hub lying inside the plane of the metallic disk connecting said expansion hub to the rim of the wheel.

The invention consists in a mechanism for carrying out the foregoing objects, which can be very easily and cheaply made, which is very light, yet strong, which is rigid under load conditions, which is otherwise generally satisfactory in operation and use, and not readily liable to get out of order. The invention very especially consists in such a construction in which there are no bolts or rivets, or other unwelded securing devices used to hold parts of the wheel proper together. More particularly, the invention consists in many features and details of construction more fully set forth in the specification and claims.

Referring to the drawings in which like numerals represent the same parts throughout the several views, Figure 1 is a vertical sectional detailed view through a wheel in which the mechanism of this invention is assembled in connection with an inserted hub of the type common to the art in so far as this application is concerned.

Figs. 2, 3 and 4 are rim structures for wheels of this invention showing particularly means for applying various forms of tire retaining rings.

Fig. 5 is a sectional detail view of the rim portion of a disk wheel of this invention slightly modified from that of Fig. 1 and showing the ring of this invention applied thereto.

Fig. 6 is a face view of one form of the securing ring of this invention removed from the wheel.

Fig. 7 is a sectional view of half of a wheel showing a different form of commercial hub from that of Fig. 1 used in constructing the wheel and a slightly differently formed outer flange and tire rim.

Fig. 8 is a sectional view of the center of the hub of a disk wheel of this invention showing a modified construction in which half hubs are parts of the disks, the half hubs being welded intermediate the disks.

Figs. 9 and 10 are views showing a modified construction of the circumferential portions of the disks and tire rim of a wheel, the tire retaining rings being present in Fig. 9 and absent in Fig. 10.

Fig. 11 is a side view of the connecting portion of a modified form of separable ring from that shown in Fig. 6, made hollow for lightness.

Fig. 12 is a sectional view on the line 12—12 of Fig. 11.

Fig. 13 is a sectional view of a wheel having the hub of Fig. 8 and the rim of Fig. 5, and Fig. 14 is another similar wheel having the hub of Fig. 8 and the rim of Fig. 4.

In constructing wheels of this invention obtaining the principal desired object stated, several different points and details of welding the rim portions of the opposite disks of the wheel may be used. For instance, in Fig. 1 the wheel comprises a disk 14 carrying on its outer edge a tire holding ring or edge 16 made by reversely curving its metallic edge member 18 to form a recess within which the extreme end 20 of the tire carrying rim 22 fits and is welded. In the case shown in this figure as in many other figures, tire carrying rim 22 has pressed into it a U-shaped recess 24 for the detachable tire holding ring of whatever type employed. The rim 22 is integral with the opposite wheel disk 26. The two opposing wheel disks 14 and 26 are, in the case shown in this figure, welded onto one of the hubs 28 used in other wheel constructions prior to this application, the disk 14 being so welded at 30 and disk 26 being so welded at 32. In other words, this wheel is, in practice, made up by pressing by proper machinery the disk 14 with the tire retaining member 16—18 and by pressing, as before the disk 26 with the parts 22—24 attached thereto. When these parts have been prepared and the hubs have been purchased or otherwise provided, the parts are assembled by placing them in the position shown and welding along the respective lines 30—20—32.

In the structure of Fig. 7, disk 34 having a tire retaining flange 36 is provided; an opposing disk 38 having a tire retaining rim 40 is provided, and the two placed in the position shown in the drawing in conjunction with a commercial hub 42, and the whole is welded together along the separate lines 44—46—48.

Whenever the wheel is to be built without the use of or reference to hubs of commerce, as in the types of structures 28 and 42 referred to, a preferred construction is made up having the hub form of Fig. 8 and the rim form of Fig. 5 as shown in Fig. 13. In this construction, one disk 50 is provided in its central portion with an integral inwardly turned half-hub 52, and, on its circumference with an integrally formed tire holding flange 54 terminating in the integrally formed half tire supporting rim 56. Similarly, an opposing disk is provided having an inwardly turned integral half-hub 60 and an inwardly turned integral half-rim 62. The construction is such that the half-rims 56 and 62 meet each other at some point intermediate between the disks 50 and 58 and are welded together at the point of juncture, in the particular case here illustrated on the central line 64. Similarly, the half-hubs 52 and 60 are of the same diameter intermediate between the disks 50 and 58 and are welded together at the point of juncture which, in the particular case here illustrated, happens to be on the line 66. A modification of this structure is shown in Fig. 14 where the outer weld is at 92 instead of in the center of the rim.

In Fig. 2 is shown a modified form of construction of joint at the tire rim and a holding ring therefor in which a rim 70 is provided having a central portion substantially concentric with the hub which carries flanges 72 and 74 and having adjacent to one flange as 72 an outwardly inclined portion 72ª so that a tire retaining ring 76 placed over the rim 70 from the right as viewed in the figure may be driven to a fit as shown in Fig. 2 on the inclined line 78. Fig. 3 shows a modified construction in which the rim 80 is provided with an exterior outwardly turned low flange 82 against which a tire retaining ring 84 fits and holds instead of being on the inclined surface 78 of Fig. 2. Fig. 4 shows another alternative construction in which a rim 86 closely resembling ring 80 is provided, there being integral with this rim a tire retaining flange 88, corresponding in function as regards the tire to members 76 and 84. The wheel disk 90, shown in Figs. 3 and 4, is secured to the adjacent rim 80 or 86 as the case may be but welded at the contact line 92.

The tire applied to the wheels of this invention may be secured in place by any of the standard forms of detachable tire retaining rims when properly designed to drop into recesses 24 formed in the respective tire rims to receive them, but the best results are obtained with the least labor by using the ring of this invention which in one form shown in Fig. 6 consists in two half rings 94 oppositely disposed to each other on approximate diameters of the wheel and fittable into the recesses 24, said rings when in place being securable together by any suitable attaching clamp or device, the one here shown being merely a bridge member 96 insertible inside the rim members 94 proper and engaged by pins or other positioning devices 97 passing through the rim members. This bridge member 96 in each case lies immediately adjacent to the tire and is forced to position against the rim members 94 by the pressure of the tire when in place. In the construction shown in Figs. 2 and 3, these members 96 only extend down to the wheel flange. In the construction of Figs. 4 and 5, the bridge member 96 is made of greater width so that it has an inwardly turned portion 98 on which the tire rests and takes bearing, thus even more securely holding the parts in place. It is immaterial whether the pins or retaining members 97 are located in the rings 94 or in the retaining members 96. In Fig. 3, the pins 97 are shown with heads 99 on the inside of the retaining members 96 so that the pins slide into and through the members 94. In the other constructions, the heads 100 of the pins are adjacent to the members 94 and the pins slidably enter the bridge member 96.

In the modified constructions of Figs. 11 and 12 the retaining rings 94 are made in the form of hollow metallic rings 102 and 104, one of them being formed with a tongue entering a socket in the other, the two being secured together by a detachable pin member 106, which is held in by the pressure of the tire bearing on its head 108.

Referring to the second sub-division of the statement of invention attention is called to the fact that between the inner wheel disks 14—34—50 and the main cylindrical portion of the hubs 28—42 and 52 respectively, there is formed in effect on the central hubs an enlarged expansion hub designated 110 in Fig. 1, and 112 in Fig. 7 and 114 in Fig. 8. For practical purposes of construction these expansion hubs are in accordance with the other features of this invention made sometimes integral with the inner disk and welded to the hub; sometimes integral with the hub and welded to the inner disk, and sometimes (Fig. 8) integral with both, but in any event it is essential in order to make this wheel conform with common automobile practice, i. e., make them interchangeable with other types of wheels, that they may be made with this enlarged expansion hub inside the plane of the rear disk of the wheel.

The foregoing is the subject matter of a divisional application, Serial No. 386,969, filed June 7, 1920.

Having thus described my invention what I claim as new and desire to secure by Letters Patent, is:—

1. A hollow metallic wheel comprising a tire supporting rim, carried from a hub by two metallic disks, these enumerated members being made of two opposing parts secured together in two weld lines.

2. A hollow metallic wheel comprising a tire supporting rim, carried from a hub by two metallic disks, these enumerated members being made of two opposing parts secured together in two weld lines running circumferentially of the wheel.

3. A hollow metallic wheel comprising a tire supporting rim, carried from a hub by two metallic disks, these enumerated members being made of two opposing parts secured together in two weld lines running circumferentially of the wheel, one of said weld lines being in proximity to the hub portion, and the other in proximity to the rim portion of the wheel.

4. A hollow metallic wheel comprising a tire supporting rim, carried from a hub by two metallic disks, these enumerated members being made of two opposing parts secured together in two weld lines, the rim being bent to form on one side thereof a tire retaining flange, and on the other side a recess for the reception of a detachable tire retaining ring.

5. A hollow metallic wheel comprising a tire supporting rim, carried from a hub by two metallic disks, these enumerated members being made of two opposing parts secured together in two weld lines, running circumferentially of the wheel, the rim being bent to form on one side thereof a tire retaining flange, and on the other side a recess for the reception of a detachable tire retaining ring.

6. A hollow metallic wheel comprising a tire supporting rim, carried from a hub by two metallic disks, these enumerated members being made of two opposing parts secured together in two weld lines running circumferentially of the wheel, one of said weld lines being in proximity to the hub portion, and the other in proximity to the rim portion of the wheel, the rim being bent to form on one side thereof a tire retaining flange, and on the other side a recess for the reception of a detachable tire retaining ring.

7. In a mechanism of the class described, a hollow metallic wheel, comprising a central hub member from which rise spaced disks connected together at the circumference of the wheel by a tire holding rim, the disks and the rim being formed in two opposing portions welded together in a single weld line.

8. In a mechanism of the class described, a hollow metallic wheel, comprising a central hub member from which rise spaced disks connected together at the circumference of the wheel by a tire holding rim, the disks and rim being formed in two opposing portions welded together in a single weld line, said weld line being in some portion of the rim.

9. In a mechanism of the class described, a hollow metallic wheel, comprising a central hub member from which rise spaced disks connected together at the circumference of the wheel by a tire holding rim, the disks and rim being formed in two opposing portions welded together in a single weld line, said weld line running circumferentially in approximately the center of the rim.

10. In a mechanism of the class described, a hollow metallic wheel comprising a central hub member from which rise spaced disks connected together at the circumference of the wheel by a tire holding rim, the disks and rim being formed in two opposing portions welded together in a single weld line, the rim being bent to form on one side thereof a tire retaining flange, and on the other side a recess for the reception of a detachable tire retaining ring.

11. In a mechanism of the class described, a hollow metallic wheel, comprising a central hub member from which rise spaced disks connected together at the circumference of the wheel by a tire holding rim, the disks and rim being formed in two opposing portions welded together in a single weld line, said weld line being in some portion of the rim, the rim being bent to form on one side thereof a tire retaining flange, and on the other side a recess for the reception of a detachable tire retaining ring.

12. In a mechanism of the class described, a hollow metallic wheel, comprising a central hub member from which rise spaced disks connected together at the circumference of the wheel by a tire holding rim, the disks and rim being formed in two opposing portions welded together in a single weld line, said weld line running circumferentially in approximately the center of the rim, the rim being bent to form on one side thereof a tire retaining flange, and on the other side a recess for the reception of a detachable tire retaining ring.

13. In a device of the class described, a wheel comprising a central hub, a concentric rim, separated front and rear disks, connecting the hub and rim, there being formed between the inner end of the hub and the rear disk an enlarged expansion hub opening outward toward the rear of the wheel, said expansion hub lying inside the principal plane of said rear disk of the wheel.

In witness whereof, I have hereunto subscribed my name in the presence of two witnesses.

JAMES A. CHARTER.

Witnesses:
DWIGHT B. CHEEVER,
ANNA ROSENTHAL.